(12) United States Patent
Manickam et al.

(10) Patent No.: US 11,831,452 B2
(45) Date of Patent: Nov. 28, 2023

(54) SYSTEM AND METHOD FOR FABRICATING VIRTUAL NETWORKS AND ALLOCATING REQUESTS THEREIN

(71) Applicant: Cognizant Technology Solutions India Pvt. Ltd., Chennai (IN)

(72) Inventors: Sathish Kumar Manickam, Essex (GB); Eby Jacob, Virginia Water (GB); Sriramajeyam Sugumaran, Illford (GB); Ramesh Gummudipundi Mohan, Chennai (IN); Mahesh Gatkal, Oxford (GB); Sheik Ahamed Kabir Syedansari, Hounslow (GB); Gnanasakthivel Ramanathan, Peterborough (GB)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 284 days.

(21) Appl. No.: 17/373,251

(22) Filed: Jul. 12, 2021

(65) Prior Publication Data
US 2023/0012385 A1    Jan. 12, 2023

(51) Int. Cl.
*G06F 15/173* (2006.01)
*H04L 12/16* (2006.01)
*H04L 12/46* (2006.01)

(52) U.S. Cl.
CPC .......... *H04L 12/16* (2013.01); *H04L 12/4641* (2013.01)

(58) Field of Classification Search
CPC . H04L 12/16; H04L 12/4641; H04L 41/0895; H04L 41/5051; H04L 41/5077
(Continued)

(56) References Cited

U.S. PATENT DOCUMENTS 8,473,421 B2    6/2013 Scalisi
2007/0021973 A1    1/2007 Stremler
(Continued)

OTHER PUBLICATIONS

Nurulhasanah Mazlan, "Crowdsourcing Approach for Volunteering System", Semantic Scholar, Puiblished 2017.
(Continued)

*Primary Examiner* — Nicholas P Celani
*Assistant Examiner* — Karina J Garcia-Ching
(74) *Attorney, Agent, or Firm* — CANTOR COLBURN LLP

(57) ABSTRACT

The present invention provides for fabricating virtual networks and allocating request-notifications therein for providing support-services securely and efficiently. In operation, a virtual network is fabricated based on network-registration requests received from plurality of computing devices. Further, a primary data structure representative of registered computing devices categorized into devices offering services and requiring services is generated based on information embedded in network-registration requests. Furthermore, a secondary data structure is generated by sub-categorising categorised computing devices based on information embedded in network-registration requests. Yet further, request-notifications for completing incoming support-requests from registered computing devices requiring services are generated. Subsequently, request-notifications are allocated based on evaluation of one or more computing devices offering services out of plurality of computing devices based on data mapping using primary data structure, secondary data structure, and predefined attributes. Finally, support-information sharing and tracking of request-notifications are enabled based on acceptance of request-notification by evaluated computing devices.

17 Claims, 4 Drawing Sheets

(58) Field of Classification Search
USPC .......................................................... 709/226
See application file for complete search history.

(56) References Cited

U.S. PATENT DOCUMENTS

| | | |
|---|---|---|
| 2007/0106575 A1 | 5/2007 | Barr |
| 2007/0198837 A1* | 8/2007 | Koodli .............. H04W 12/0471 |
| | | 713/153 |
| 2009/0192873 A1 | 7/2009 | Marble |
| 2012/0317044 A1 | 12/2012 | Massarik |
| 2013/0151432 A1 | 6/2013 | Kashner |
| 2014/0188707 A1 | 7/2014 | Typaldos |
| 2014/0207695 A1 | 7/2014 | Beekman |
| 2015/0161564 A1* | 6/2015 | Sweeney ........ G06Q 10/063114 |
| | | 705/338 |
| 2016/0100302 A1 | 4/2016 | Barash |
| 2021/0182759 A1* | 6/2021 | O'Mahony ...... G06Q 10/06316 |
| 2022/0400103 A1* | 12/2022 | Jafri ..................... G06F 21/316 |

OTHER PUBLICATIONS

Safeguard your volunteers: why software works for charities, URL: https://www.breathehr.com/en-gb/blog/topic/breathe-news/safeguard-your-volunteers-why-charity-software-is-necessary, Jun. 12, 2019.

\* cited by examiner

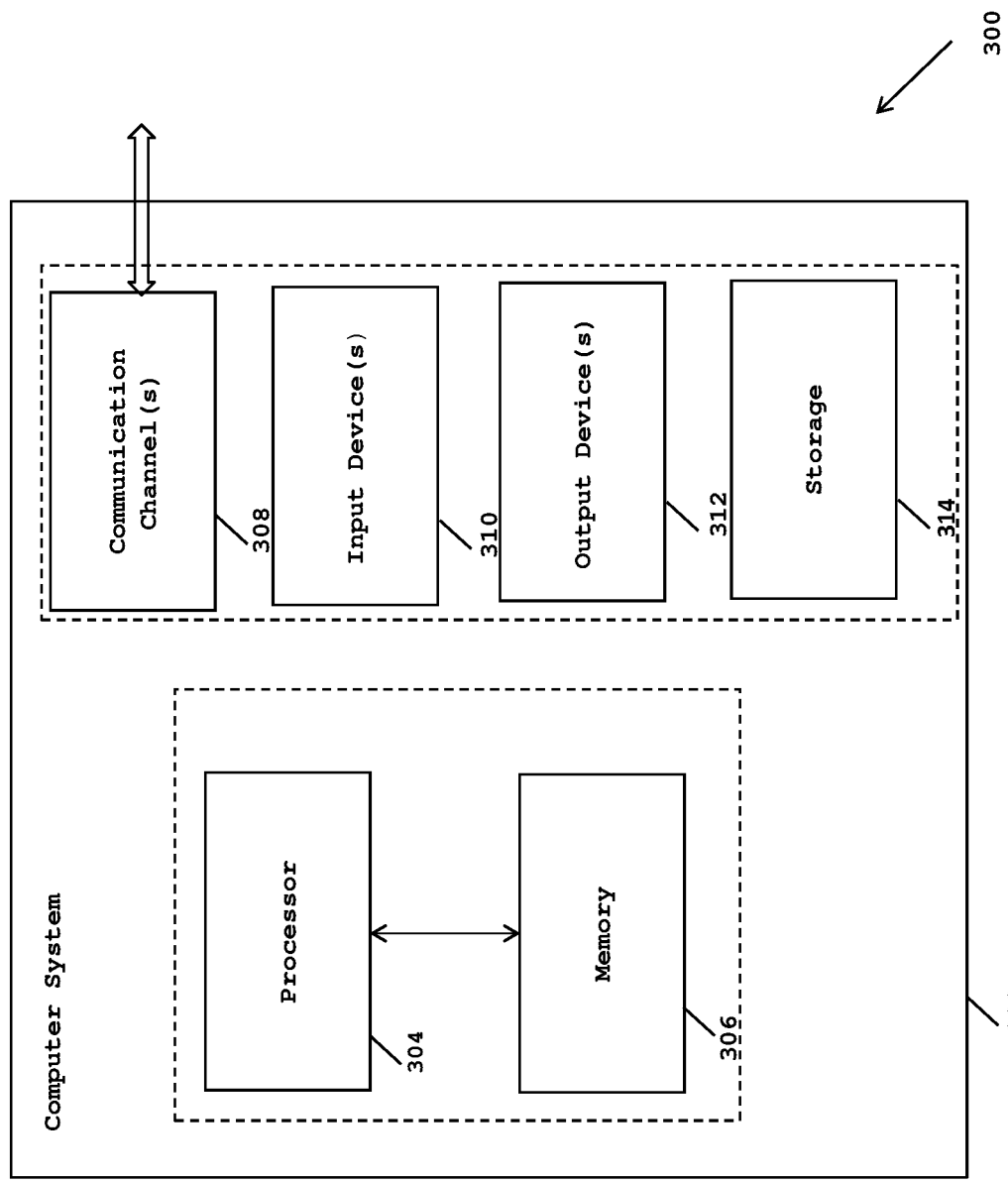

SYSTEM AND METHOD FOR FABRICATING VIRTUAL NETWORKS AND ALLOCATING REQUESTS THEREIN

FIELD OF THE INVENTION

The present invention generally relates to network-based platforms. More particularly, the present invention relates to a system and a method for facilitating fabrication of virtual networks and allocation of request notifications within said networks in real time using advanced data mapping to provide selective information sharing, anonymity and improved network efficiency.

BACKGROUND OF THE INVENTION

In the existing era of technology, virtual networks, in particular, virtual community networks may be formed via computing devices associated with various entities including, but not limited to, organizations such as non-profit organizations, individual donors, service providers such as volunteers, and service receivers such as customers or beneficiaries, with an aim to explore each other, communicate, and offer/receive services using internet-based platforms. The virtual networks created over existing internet-based platforms, such as, email servers or social networking sites may include, but are not limited to, IT support networks, delivery service networks, and donation service networks among other networks. However, the virtual networks created over generic internet-based platforms fail to establish rules for authentication of users associated with the computing devices joining the virtual network. Further, the allocation as well as the completion of service requests arising between the computing devices require human intervention and are unregulated. Furthermore, the computing devices and/or the users of the computing devices receiving services are susceptible to fraud from the computing devices and/or users associated with the computing devices offering services, and vice versa. Yet further, the data sharing between the computing devices is unregulated which may further harm the safety of users associated with the computing device.

In light of the aforementioned drawbacks, there is a need for a system and a method which can facilitate fabrication of secure virtual networks. There is a need for a system and a method which can efficiently allocate request notifications between computing devices associated with the network. There is a need for a system and a method which offers real time request allocation and request tracking. There is need for a system and a method which offers selective information sharing and ensures anonymity and safety of users associated with the computing devices. There is a need for a system and a method which can be easily integrated with existing virtual networks. Yet further, there is a need for a system and a method which is economical and secure.

SUMMARY OF THE INVENTION

In various embodiments of the present invention, a method for fabricating a virtual network for providing services securely and efficiently is provided. The method is implemented by at least one processor executing program instructions stored in a memory. The method comprises fabricating a virtual network by registering a plurality of computing devices based on an information embedded in network-registration requests received from the plurality of computing devices. The method further comprises generating a primary data structure representative of the plurality of computing devices categorized into devices offering services and requiring services based on the information embedded in the network-registration requests. Further, the method comprises generating a secondary data structure by sub-categorizing the categorized computing devices based on the information embedded in the received network-registration requests. Furthermore, the method comprises allocating a request-notification generated in response to a support-request based on an evaluation of one or more computing devices offering services out of the plurality of computing devices, which are capable of completing said support-requests with minimum delay using the primary data structure, the secondary data structure, and a set of predefined attributes. The request-notification is representative of a notification for completing the support-request. Yet further, the method comprises enabling access to a support-information embedded in the request-notification for the evaluated one or more computing devices on acceptance of the request-notifications by the evaluated one or more computing devices.

In various embodiments of the present invention, a system for fabricating a virtual network for providing services securely and efficiently is provided. The system comprises a memory storing program instructions, a processor configured to execute program instructions stored in the memory, and a network connectivity engine executed by the processor, and configured to fabricate a virtual network by registering a plurality of computing devices based on an information embedded in network-registration requests received from the plurality of computing devices. Further, the system is configured to generate a primary data structure representative of the plurality of computing devices categorized into devices offering services and requiring services based on the information embedded in the network-registration requests. Furthermore, the system is configured to generate a secondary data structure by sub-categorizing the categorized computing devices based on the information embedded in the received network-registration requests. Yet further, the system is configured to allocate a request-notification generated in response to a support-request based on an evaluation of one or more computing devices offering services out of the plurality of computing devices, which are capable of completing said support-requests with minimum delay using the primary data structure, the secondary data structure, and a set of predefined attributes, where the request-notification is representative of a notification for completing the support-request. Yet further, the system is configured to enable access to a support-information embedded in the request-notification for the evaluated one or more computing devices on acceptance of the request-notifications by the evaluated one or more computing devices.

In various embodiments of the present invention, a computer program product is provided. The computer program product comprises a non-transitory computer-readable medium having computer-readable program code stored thereon, the computer-readable program code comprising instructions that, when executed by a processor, cause the processor to fabricate a virtual network by registering a plurality of computing devices based on an information embedded in network-registration requests received from said plurality of computing devices. Further, a primary data structure representative of the plurality of computing devices categorized into devices offering services and requiring services is generated based on the information embedded in the network-registration requests. Furthermore, a secondary data structure is generated by sub-categorizing the categorized computing devices based on the information embedded in the received network-registration requests. Yet further, a request-notification generated in response to a support-request is allocated based on an evaluation of one or more computing devices offering services out of the plurality of computing devices, which are capable of completing said support-requests with minimum delay using the primary data structure, the secondary data structure, and a set of predefined attributes, where the request-notification is representative of a notification for completing the support-request. Yet further, access to a support-information embedded in the request-notification is enabled for the evaluated one or more computing devices on acceptance of the request-notifications by the evaluated one or more computing devices.

BRIEF DESCRIPTION OF THE ACCOMPANYING DRAWINGS

The present invention is described by way of embodiments illustrated in the accompanying drawings wherein:

FIG. 3 illustrates an exemplary computer system in which various embodiments of the present invention may be implemented.

DETAILED DESCRIPTION OF THE INVENTION

Figure 1:
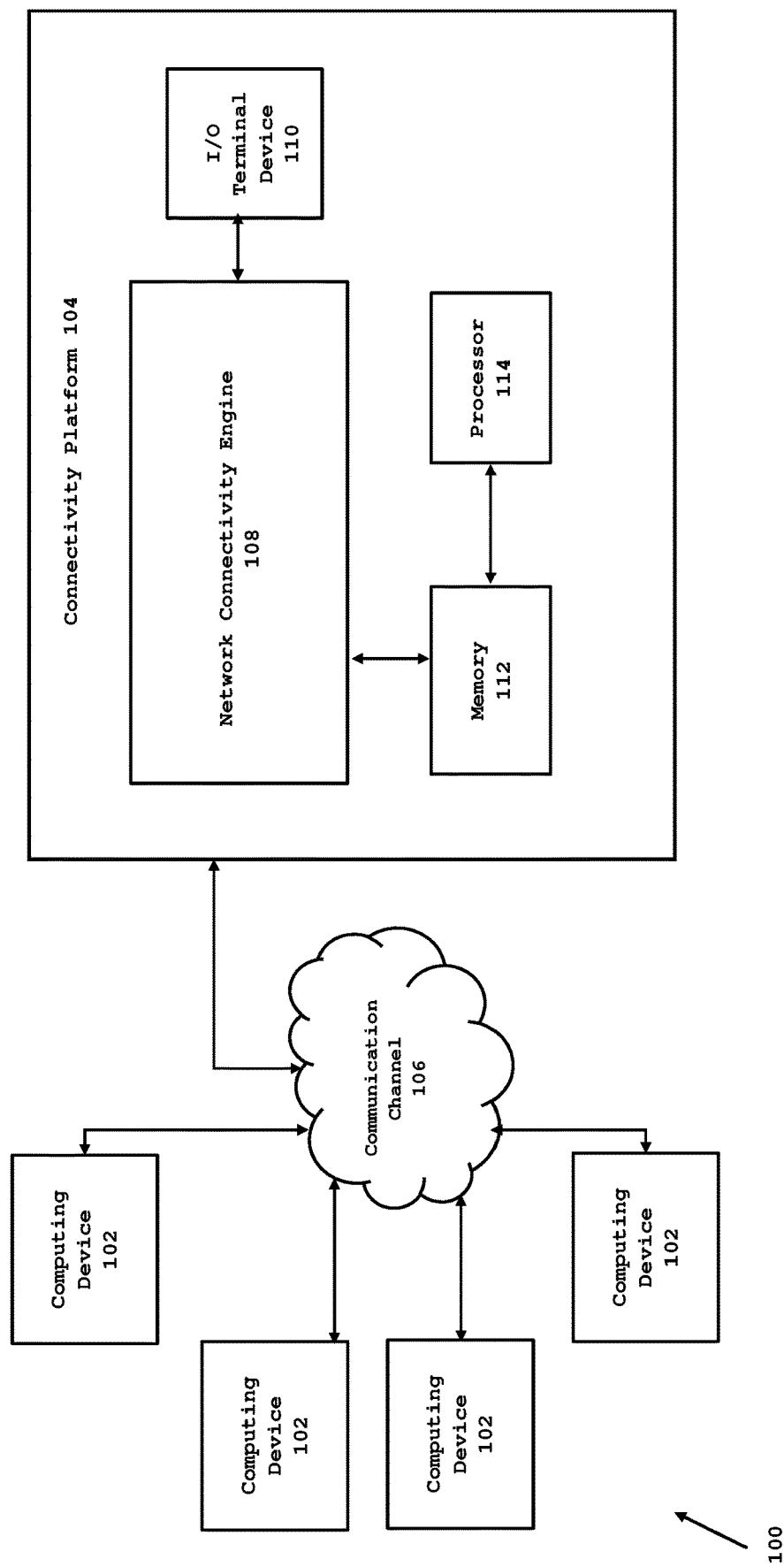
FIG. 1 illustrates a block diagram of a system for fabricating a virtual network and allocating request notifications therein for providing support-services securely and efficiently, in accordance with various embodiments of the present invention.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention. The term "virtual network" as used in the specification refers to computing devices connected together over a network in order to offer and receive services. The terms "request-notification" and "request notification" have been used interchangeably. The term "beneficiary computing devices" as used in the specification refers to computing devices which require services or resources. The term "donor computing devices" as used in the specification refers to computing devices which provide resources or offerings. The term "volunteer computing devices" as used in the specification refers to computing devices that act as intermediators to transmit services from donor computing devices to the beneficiary computing devices.

The present invention discloses a system and a method for fabricating virtual networks and allocating request notifications between the computing devices associated with the network for providing support-services securely and efficiently. In particular, the present invention provides for fabricating a virtual network based on network-registration requests received from a plurality of computing devices. Each network-registration request is embedded with information comprising, but not limited to, computing device name, computing device registration number, contact details of a user associated with the computing device, computing device coordinates, user name, user-address, services offered and/or required by the computing device. Further, a primary data structure is generated based on the information embedded in the received network-registration requests, where the primary data structure is representative of registered computing devices categorized into devices offering services and/or requiring services. Furthermore, a secondary data structure is generated by sub-categorising each of the categorised computing devices based on the coordinates of the computing devices and the user address associated with the computing devices. Yet further, notifications for completing incoming support-requests from the registered computing devices requiring services are generated, where the generated notifications are embedded with support-information associated with the computing devices requiring services, the support-information including at least the requirements. Subsequently, the generated notification are allocated between the registered computing devices offering services based on a data mapping using the primary data structure, the secondary data structure, and a set of predefined attributes. The predefined attributes include, but are not limited to, type of service, number of incoming requests associated with the same type of service, number of incoming requests from computing devices within a pre-set proximity, and availability of computing devices within the pre-set proximity of incoming requests. Finally, the request-notifications are allocated to the mapped computing devices offering services, and support-information sharing and tracking of the request notifications are enabled based on an acceptance of the request-notification by the mapped computing devices.

The present invention would now be discussed in context of embodiments as illustrated in the accompanying drawings. Referring to FIG. 1, a network environment 100 including a system for fabricating a virtual network and allocating request notifications therein is shown in accordance with various embodiments of the present invention. In an embodiment of the present invention, the network environment 100 comprises a plurality of computing devices 102, and a system for fabricating a virtual network and allocating request-notifications, hereinafter referred to as the connectivity platform 104.

In accordance with various embodiments of the present invention, each of the plurality of computing devices 102 may be general purpose computers such as desktops, notebooks, smartphones and tablets; super computers; microcomputers or any other device capable of executing instructions, connecting to a network and transmitting/receiving data. In various embodiments of the present invention, each of the plurality of computing devices 102 are configured to interface with the connectivity platform 104 to register with the network, input information or queries, offer/receive services and receive notifications. In an embodiment of the present invention as shown in FIG. 1, each of the plurality of computing devices 102 are configured to interface with the connectivity platform 104 over the communication channel 106. Examples of the communication channel may include, but are not limited to, an interface such as a software interface, a physical transmission medium such as a wire, or a logical connection over a multiplexed medium such as a radio channel in telecommunications and computer networking. Examples of radio channel in telecommunications and computer networking may include, but are not limited to, a Local Area Network (LAN), a Metropolitan Area Network (MAN), and a Wide Area Network (WAN).

In accordance with various embodiments of the present invention, the connectivity platform 104 may be a software or a combination of software and hardware. In an embodiment of the present invention as shown in FIG. 1, the connectivity platform 104 is a combination of software and hardware. In an embodiment of the present invention, the connectivity platform 104 is implemented as a web-application in a client-server architecture, wherein the plurality of computing devices 102 accesses a server hosting the connectivity platform 104 over the communication channel 106.

In another embodiment of the present invention, the connectivity platform 104 may be implemented in a cloud computing architecture in which data, applications, services, and other resources are stored and delivered through shared data-centres. In an exemplary embodiment of the present invention, the functionalities of the connectivity platform 104 are delivered as Software as a Service (SAAS) to the end user organisation or entity requiring fabrication of virtual network. In an exemplary embodiment of the present invention, the connectivity platform 104 may be implemented using google cloud platform.

In various embodiments of the present invention, the connectivity platform 104 is configured to interface with the plurality of computing devices 102 over the communication channel 106 to receive network-registration requests and support-requests, and further transmit request-notifications and tracking information to the computing devices 102. In an exemplary embodiment of the present invention, the connectivity platform 104 may be accessed via an IP address/domain name through each of the plurality of computing devices 102. In another exemplary embodiment of the present invention, a user interface module of the connectivity platform 104 may be installed on the computing devices 102 to access the connectivity platform 104.

In various embodiments of the present invention, the connectivity platform 104 comprises a network connectivity engine 108, an Input/output terminal device 110, a memory 112 and a processor 114. In accordance with various embodiments of the present invention, the network connectivity engine 108 is operated via the processor 114 specifically programmed to execute instructions stored in the memory 112 for executing functionalities of the platform 104 in accordance with various embodiments of the present invention. In accordance with various embodiments of the present invention, the network connectivity engine 108 is configured to receive network-registration requests, categorise and sub-categorise computing devices based on the information embedded in the network-registration requests, allocate request-notifications in response to support-requests, establish private communication line and track support-requests. The network connectivity engine 108 is discussed in detail later in the specification with reference to FIG. 1A. In an embodiment of the present invention, the memory 112 may be partitioned into a Random Access Memory (RAM), a Read-only memory (ROM) and a hard disk drive (HDD). In various embodiments of the present invention, examples of the input/output (I/O) terminal device 110 may include, but are not limited to, a touchscreen display, a combination of keyboard and a display or any other wired or wireless device capable of receiving inputs and displaying output results.

Figure 1A:
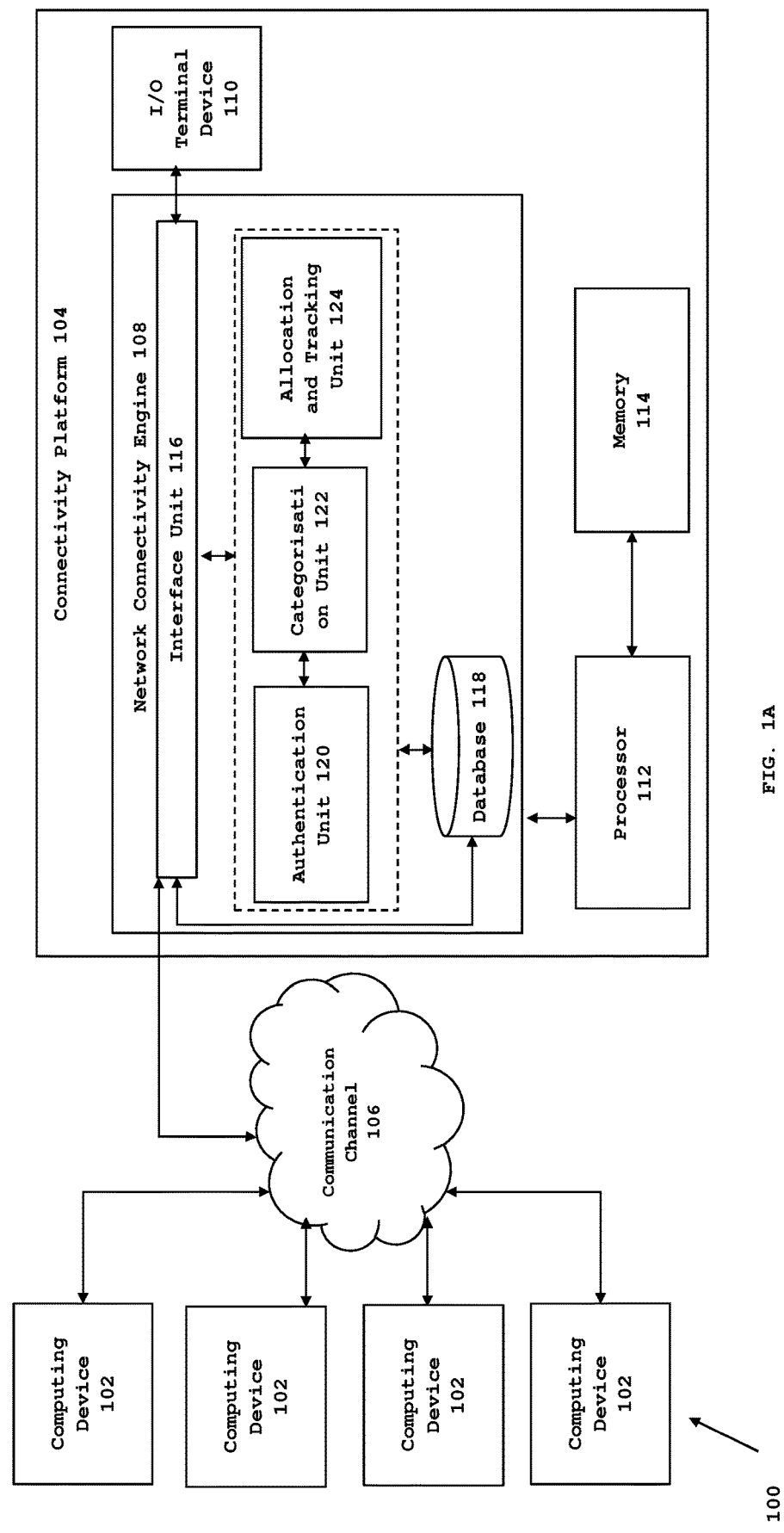
FIG. 1A illustrates a detailed block diagram of a system for fabricating a virtual network and allocating request notifications therein for providing support-services securely and efficiently, in accordance with an embodiment of the present invention.

Referring to FIG. 1A, the network connectivity engine 108 comprises an interface unit 116, a database 118, an authentication unit 120, a categorization unit 122, and an allocation and tracking unit 124. The various units of the network connectivity engine 108 are operated via the processor 114 specifically programmed to execute instructions stored in the memory 112 for executing respective functionalities of the multiple units 116, 120, 122, and 124, in accordance with various embodiments of the present invention. In accordance with an exemplary embodiment of the present invention, the interface unit 116 is implemented using HTML Markup, CSS, SCSS, in Vue JS as a presentation layer. The authentication unit 120, the categorisation unit 122, and the allocation and tracking unit 124 are implemented using Node JS and Google Firebase Functions as logical layer. The database 118 is implemented using Google Firebase Fire-store Database as a data layer.

In various embodiments of the present invention, the interface unit 116 is configured to provide interfacing with the plurality of computing devices 102 over the communication channel 106. In an embodiment of the present invention, the interface unit 116 is configured to interface with the I/O terminal device 110 over a software interface (not shown) to receive input configurations of the network connectivity engine 108. In an embodiment of the present invention, the interface unit 116 includes an end-user Graphical User Interface (not shown) accessible on the plurality of computing devices 102 to facilitate user interaction. In an exemplary embodiment of the present invention, the Graphical User Interface allows for creation of login credentials, sign-in using login credentials, provides tabs for network registration of the plurality of computing devices 102, provide tools for offering/receiving support services, select, input and share information, input queries, make requests. Further, the GUI facilities sending and receiving of notifications, and accessing tracking information among other things. In an embodiment of the present invention, the Graphical User Interface associated with the interface unit 116 may be accessed from each of the plurality of computing devices 102 through an IP address. In another embodiment of the present invention, the GUI of the interface unit 116 is accessible by the computing device 102 via the user interface module of the connectivity platform 104 installable on computing device 102.

In various embodiments of the present invention, the interface unit 116 is configured to receive network-registration requests from each of the plurality of computing devices 102. Each network-registration request is embedded with information comprising, but not limited to, computing device name, computing device registration number, such as—IMEI number, contact details of a user associated with the computing device, such as a phone-number, computing device coordinates, user name, user-address, services offered or required by the computing device, in particular services required by a user associated with the computing device 102. In operation, in an embodiment of the present invention, a user associated with respective computing devices 102 creates a set of login credentials via the interface unit 116. In particular, the graphical user interface (GUI—not shown) of the interface unit 116 facilitates user of each computing device 102 to create credentials based on a set of predefined user-roles in the network. In an exemplary embodiment of the present invention, the user-role may be defined by the admin of the connectivity platform 104. Further, user-access to the one or more functionalities of the connectivity platform 104 is authenticated by the interface unit 116 via the authentication unit 120 based on the set of predefined user-roles.

In an embodiment of the present invention, the authentication unit 120 is configured to authenticate user-access using one or more authentication techniques selected from a custom based authentication and a Single Sign-On (SSO) based authentication. In an exemplary embodiment of the present invention, the custom based authentication, may include, but is not limited to, implementing a JSON Web Token (JWT) authentication for authenticating the individual users of the computing devices 102 and users of a specific group. The SSO based authentication may include, but is not limited to the implementation of LDAP authentication mechanism to authenticate users. In an exemplary embodiment of the present invention, the interface unit 116 may be integrated with social media platforms such as Google Account and Facebook for single sign-on.

Subsequent to the user authentication, the interface unit 116 provides access to one or more functionalities of the connectivity platform 104 based on the set of predefined user-role. In particular, the interface unit 116 provides access for generating network-registration requests via the Graphical User Interface on the respective computing devices 102. Further, the interface unit 116 provides access for generating support-requests, tracking notification status, data access, inputting queries etc. based on the set of predefined user-roles. In various embodiments of the present invention, the network-registration requests along with the set of predefined user-roles are stored and maintained in the database 118.

In accordance with various embodiments of the present invention, the categorization unit 122 is configured to receive the network-registration requests from the interface unit 116. In various embodiments of the present invention, the categorization unit 122 is configured to fabricate a virtual network by registering the each of the computing devices 102 based on the network-registration requests. In particular, the categorization unit 122 is configured to fabricate a virtual network by registering the computing devices 102 based on the information embedded in the network-registration requests. In an exemplary embodiment of the present invention, the connectivity platform 104 may be implemented to fabricate a virtual community network, where the computing devices 102 are associated with users requiring services referred to as beneficiaries and the users offering services such as volunteers and donors.

In an embodiment of the present invention, the categorization unit 122 is configured to generate a primary data structure by categorizing each of the registered computing devices 102 based on the information embedded in the network-registration requests. The primary data structure is representative of registered computing devices categorized into devices offering services and requiring services. In operation, in the exemplary embodiment of the present invention, the categorisation unit 122 creates a primary data structure by categorising the computing devices 102 into devices offering services and requiring services. In particular, the categorisation unit 122 creates the primary data structure by categorising the devices registered as computing devices offering services, such as, volunteer computing devices and donor computing devices, and computing devices requiring services, such as, beneficiary computing devices based on the information embedded in the network-registration requests.

In accordance with various embodiments of the present invention, the categorisation unit 122 is configured to generate a secondary data structure by sub-categorising each of the categorised computing devices 102 based on the information embedded in the network-registration requests. In particular, the categorisation unit 122 is configured to generate the secondary data structure by sub-categorising the categorised computing devices 102 based on the coordinates and respective user-addresses associated with the computing devices.

In accordance with various embodiments of the present invention, the allocation and tracking unit 124 is configured to receive the primary and secondary data structures representative of categorized and sub-categorized computing devices from the categorization unit 122. In various embodiments of the present invention, the allocation and tracking unit 124 is configured to generate request-notifications based on the support-requests received from the registered computing devices 102 requiring services. The request-notifications are representative of notifications for completing incoming support-requests. In an embodiment of the present invention, the support-requests are created via the end-user Graphical User Interface on the computing devices 102 requiring services. In an exemplary embodiment of the present invention, the support-requests may be related to, but are not limited to, at least one of: chat support, grocery collection and delivery, medicinal support, prescription and/or medicine collection from pharmacy, dog walking, video and/or audio calls, old age support and mental health check support. In an exemplary embodiment of the present invention, medicinal support includes, but is not limited to, collecting and delivering oxygen cylinder, oxygen concentrator, and vaccination. It is to be understood that the scope of the present invention is not limited to support-requests as exemplified above. In an embodiment of the present invention, the generated request-notifications are embedded with support-information. In an embodiment of the present information, the support-information may include at least the requirements, the coordinates and the user details associated with the computing devices 102 requiring services. The user details include, but are not limited to, contact-details, user name and user address.

In various embodiments of the present invention, the allocation and tracking unit 124 is configured to allocate the generated request-notifications to the one or more computing devices 102 offering services out of the plurality of registered computing devices. In an embodiment of the present invention, the request notifications are allocated based on evaluation of one more computing devices 102 offering services capable of completing the support-requests with minimum delay using a data mapping technique on the primary data structure, the secondary data structure, and a set of predefined attributes. In an embodiment of the present invention, the predefined attributes include, but are not limited to, type of service, number of incoming support-requests associated with the same type of service, number of incoming support-requests within a pre-set proximity to the computing devices offering services, and availability of computing devices offering services within the pre-set proximity to the computing device making support-request. In an exemplary embodiment of the present invention, the data mapping may be performed by a user, hereinafter referred to, as a moderator via the computing device 102 based on the predefined user-role.

In operation in an exemplary embodiment of the present invention, at least the requirements and coordinates associated with the computing device and/or the user of the computing device requiring services as embedded in the support-request are mapped to the computing devices offering services. Subsequently, the one or more computing devices offering the requested service within a pre-set proximity to the computing device making the support-request are selected based on their availability. In the exemplary embodiment of the present invention, where the devices are registered as computing devices offering services, such as, volunteer computing devices and donor computing devices, and computing devices requiring services, such as, beneficiary computing devices; the request-notifications embedded with support-information are allocated to the computing devices 102 associated with a donor and a volunteer using data mapping on the primary data structure, the secondary data structure, and the set of predefined attributes. Subsequently, the allocation and tracking unit 124 is configured to transmit the request-notifications to the evaluated one or more computing devices 102. In an embodiment of the present invention, access to the support-information embedded in the request-notifications is enabled for the evaluated one or more computing devices 102 offering services on acceptance of the request-notifications by said one or more computing devices 102. In an embodiment of the present invention, enabling access to the support-information comprises establishing a private communication line between the computing devices requiring service associated with the support-request and the evaluated one or more computing devices offering services, and sharing the support-information over the private communication line.

In various embodiments of the present invention, access to the support-information is denied if the mapped computing device rejects the request-notification for completing the incoming support-requests. Further, the allocation and tracking unit 124 is configured to allocate request-notifications to other computing devices using the primary data structure, the secondary data structure, and the set of predefined attributes.

In various embodiments of the present invention, the allocation and tracking unit 124 is configured to enable tracking of the request-notifications on acceptance of the notifications by the evaluated one or more computing devices 102. In particular, the allocation and tracking unit 124 is configured to provide real-time progress data of the support-request to the respective computing devices 102 requiring services associated with incoming support-requests. In an exemplary embodiment of the present invention, where the devices are registered as computing devices offering services, such as, volunteer computing devices and donor computing devices, and computing devices requiring services, such as, beneficiary computing devices; the allocation and tracking unit 124 is configured to transmit real-time activity progress data of the computing devices offering services to the beneficiary computing devices.

Advantageously, the connectivity platform 104 of the present invention facilitates fabrication of secure virtual networks and efficiently allocates support-request notifications between computing devices associated with the network. Additionally, the connectivity platform 104 offers real-time request allocation and tracking along with selective information sharing to ensure anonymity and safety of users associated with the computing devices. The security, anonymity and real-time request allocation offered by the connectivity platform may be advantageously implemented to fabricate virtual community networks to support various users during all times, especially during isolation at the time of extra-ordinary circumstances such as a global pandemic.

Figure 2:
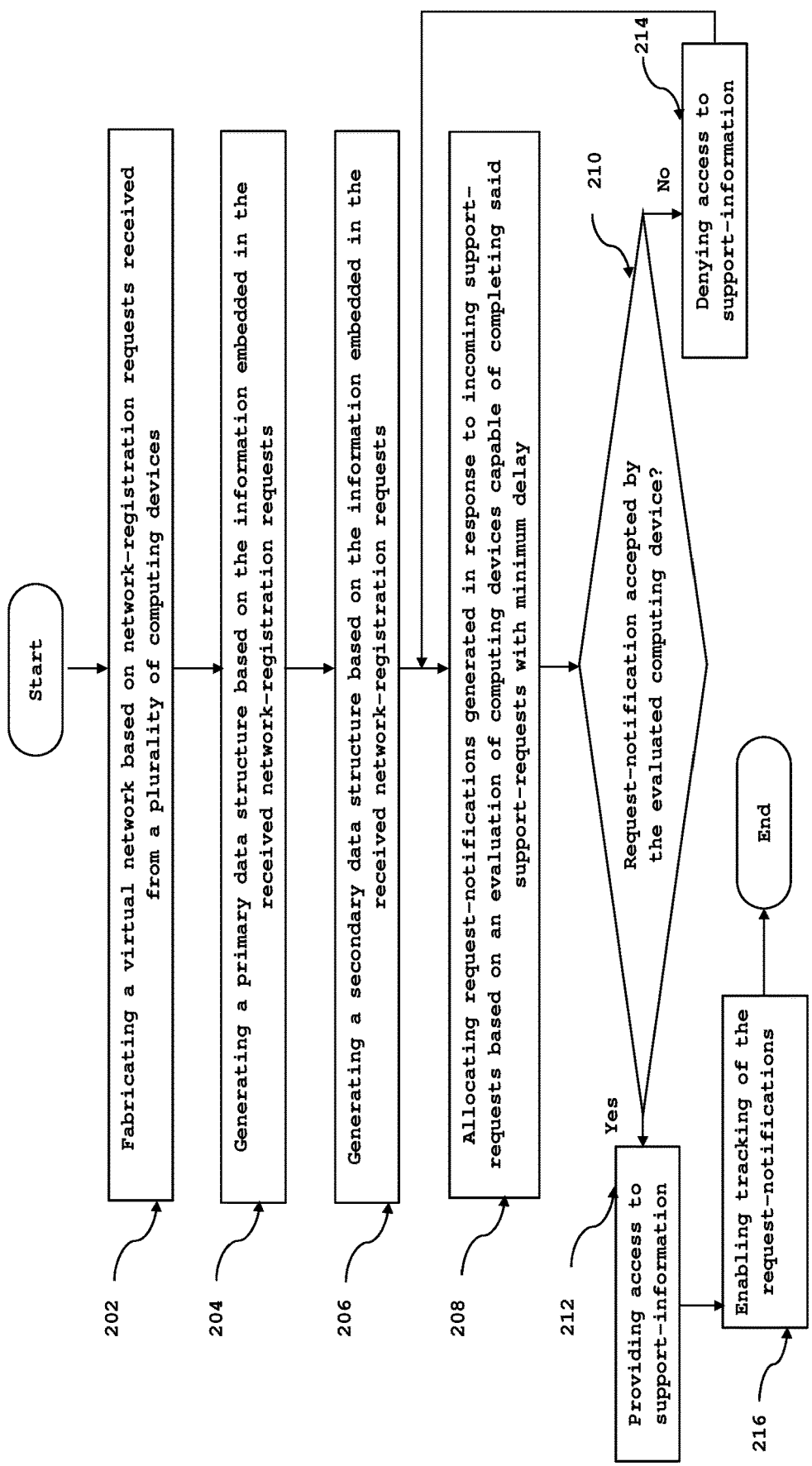
FIG. 2 is a flowchart illustrating a method for fabricating a virtual network and allocating request notifications therein for providing support-services securely and efficiently, in accordance with various embodiments of the present invention.

Referring to FIG. 2 a flowchart illustrating a method for fabricating a virtual network and allocating request notifications therein for providing support-services securely and efficiently is shown, in accordance with various embodiments of the present invention.

At step 202, a virtual network is fabricated based on network-registration requests received from each of a plurality of computing devices. In an embodiment of the present invention, the network-registration requests are received from each of the plurality of computing devices (102 of FIG. 1) over a communication channel. Each network-registration request is embedded with information comprising, but not limited to, computing device name, computing device registration number, such as—IMEI number, contact details of a user associated with the computing device, such as a phone-number, computing device coordinates, user name, user-address, services offered or required by the computing device, in particular services required by a user associated with the computing device. In operation, the network-registration requests are received from each of the computing devices subsequent to an authentication of the computing devices. In particular, the network-registration requests are received from each of the computing devices subsequent to an authentication of a user associated with respective computing device. In an embodiment of the present invention, user-access may be authenticated using one or more authentication techniques selected from a custom based authentication and a Single Sign-On (SSO) based authentication. In an exemplary embodiment of the present invention, social media platforms such as google account and Facebook are used for single sign-on. Further, a virtual network is fabricated by registering the computing devices based on the information embedded in the network-registration requests. In an exemplary embodiment of the present invention, a virtual community network is fabricated, where the computing devices are associated with users requiring services referred to as beneficiaries, and the users offering services such as volunteers and donors.

At step 204, a primary data structure is generated based on the information embedded in the received network-registration requests. In an embodiment of the present invention, a primary data structure is generated by categorizing each of the registered computing devices 102 based on the information embedded in the network-registration requests. The primary data structure is representative of registered computing devices categorized into devices offering services and requiring services. In an exemplary embodiment of the present invention, the primary data structure is generated by categorising the devices registered as computing devices offering services, such as, volunteer computing devices and donor computing devices, and computing devices requiring services, such as, beneficiary computing devices based on the information embedded in the network-registration requests.

At step 206, a secondary data structure is generated based on the information embedded in the received network-registration requests. In an embodiment of the present invention, a secondary data structure is generated by sub-categorising each of the categorised computing devices based on the information embedded in the network-registration requests. In particular, the secondary data structure is generated by sub-categorising the categorised computing devices based on the coordinates and respective user-addresses associated with the computing devices.

At step 208, request-notifications generated in response to incoming support-requests are allocated based on an evaluation of computing devices capable of completing said support-requests with minimum delay. In an embodiment of the present invention, request-notifications are generated based on the support-requests received from the registered computing devices requiring services. The request-notifications are representative of notifications for completing incoming support-requests. In an exemplary embodiment of the present invention, the support-requests may be related to, but are not limited to, at least one of: chat support, grocery/food collection and delivery, medicinal support, prescription and/or medicine collection from pharmacy and the like, dog walking, video and/or audio calls, old age support and mental health check support. In an exemplary embodiment of the present invention, medicinal support includes, but is not limited to, collecting and delivering oxygen cylinder, oxygen concentrator, and vaccination. It is to be understood that the scope of the present invention is not limited to support-requests as exemplified above. In an embodiment of the present invention, the generated request-notifications are embedded with support-information. In an embodiment of the present information the support-information may include at least the requirements, the coordinates and the user details associated with the computing devices requiring services, where the user details include, but are not limited to, contact-details, user name and user address.

In an embodiment of the present invention, the request notification are allocated based on evaluation of one more computing devices offering services out of the plurality of computing devices, which are capable of completing the support-requests with minimum delay using a data mapping technique on the primary data structure, the secondary data structure, and a set of predefined attributes. In an embodiment of the present invention, the predefined attributes include, but are not limited to, type of service, number of incoming support-requests associated with the same type of service, number of incoming support-requests within a pre-set proximity to the computing devices offering services, and availability of computing devices offering services within the pre-set proximity to the computing device making support-request. In operation in an exemplary embodiment of the present invention, at least the requirements and coordinates associated with the computing device and/or the user of the computing device requiring services as embedded in the support-request are mapped to the computing devices offering services. Subsequently, the one or more computing devices offering the requested service within a pre-set proximity to the computing device making the support-request are selected based on their availability. In the exemplary embodiment of the present invention, where the devices are registered as computing devices offering services, such as, volunteer computing devices and donor computing devices, and computing devices requiring services, such as, beneficiary computing devices; the request-notifications embedded with support-information are allocated to the computing devices associated with a donor and a volunteer using data mapping on the primary data structure, the secondary data structure, and a set of predefined attributes.

At step 210, determining if the request-notifications are accepted by the evaluated one or more computing devices.

At step 212, access to the support-information embedded in the request-notifications is enabled for the evaluated one or more computing devices offering services on acceptance of the request-notifications by said one or more computing devices. In an embodiment of the present invention, enabling access to the support-information comprises establishing a private communication line between the computing devices requiring service associated with the support-request and the evaluated one or more computing devices offering services, and sharing the support-information over the private communication line.

At step 214, access to the support-information is denied if the evaluated one or more computing device rejects the request-notification for completing the incoming support-requests. Subsequently, the request-notifications are allocated to other computing devices. In an embodiment of the present invention, the request-notifications are reallocated to other computing devices using the data mapping technique on the primary data structure, the secondary data structure, and the set of predefined attributes if the evaluated computing device rejects the request-notification.

At step 216, tracking of the request-notifications is enabled on acceptance of the request-notification by the evaluated one or more computing devices. In an embodiment of the present invention, real-time progress data of the support-request is transmitted to the respective computing devices requiring services associated with incoming support-requests. In an exemplary embodiment of the present invention, where the devices are registered as computing devices offering services, such as, volunteer computing devices and donor computing devices, and computing devices requiring services, such as, beneficiary computing devices; the real-time activity progress data of the computing devices offering services is transmitted to the beneficiary computing devices.

Advantageously, the method in accordance with various embodiments of the present invention facilitates fabrication of secure virtual networks and efficiently allocates support-request notifications between computing devices associated with the network. Further, the method of the present invention offers real-time request allocation and tracking along with selective information sharing to ensure anonymity and safety of users associated with the computing devices.

FIG. 3 illustrates an exemplary computer system in which various embodiments of the present invention may be implemented. The computer system 302 comprises a processor 304 and a memory 306. The processor 304 executes program instructions and is a real processor. The computer system 302 is not intended to suggest any limitation as to scope of use or functionality of described embodiments. For example, the computer system 302 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 310 may include, but not limited to, a keyboard, mouse, pen, joystick, trackball, a voice device, a scanning device, touch screen or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including, but not limited to, a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A method for fabricating a virtual network for providing services securely and efficiently, the method is implemented by at least one processor executing program instructions stored in a memory, the method comprising:
    fabricating, by the processor, a virtual network by registering a plurality of computing devices based on an information embedded in network-registration requests received from said plurality of computing devices;
    generating, by the processor, a primary data structure representative of the plurality of computing devices categorized into devices offering services and requiring services based on the information embedded in the network-registration requests;
    generating, by the processor, a secondary data structure by sub-categorizing the categorized computing devices based on the information embedded in the received network-registration requests, the information including coordinates of the computing devices and a user-address associated with the respective computing devices;
    allocating, by the processor, a request-notification generated in response to a support-request received from the computing devices requiring services based on an evaluation of one or more computing devices offering services out of the plurality of computing devices, which are capable of completing said support-request with minimum delay using the primary data structure, the secondary data structure, and a set of predefined attributes, the request-notification is representative of a notification for completing the support-request, wherein the evaluation of the one or more computing devices offering services is performed using a data mapping technique on the primary data structure, the secondary data structure, the set of predefined attributes including a type of service selected from a group consisting of: chat support, dog walking, video and/or audio calls, and mental health check support, a number of incoming support-requests associated with a same type of service, a number of incoming support-requests within a pre-set proximity to the computing devices offering services, and availability of computing devices offering services within the pre-set proximity to the computing device making the support-request; and
    enabling, by the processor, access to a support-information embedded in the request-notification for the evaluated one or more computing devices on acceptance of the request-notifications by the evaluated one or more computing devices.

2. The method as claimed in claim 1, wherein tracking of the request-notification is enabled on acceptance of the request-notification by the evaluated one or more computing devices, wherein the tracking comprises transmission of real-time progress data of the support-request to the computing devices associated with the support-request.

3. The method as claimed in claim 1, wherein the information embedded in each of the network-registration requests is associated with the respective computing devices, said information comprising at least the computing device name, contact details of a user associated with the computing device, computing device coordinates, name and address of a user associated with the computing device, services offered and/or required by the computing device.

4. The method as claimed in claim 1, wherein the support-information comprises at least requirements, coordinates and user details associated with the computing device requiring services.

5. The method as claimed in claim 1, wherein access to the support-information is denied if the evaluated one or more computing device rejects the request-notification for completing the support-request.

6. The method as claimed in claim 1, wherein the request-notification is reallocated to other computing devices offering services out of the plurality of computing devices using the data mapping technique on the primary data structure, the secondary data structure, and the set of predefined attributes if the evaluated one or more computing devices rejects the request-notification.

7. The method as claimed in claim 1, wherein enabling access to the support-information comprises establishing a private communication line between the computing device associated with the support-request and the evaluated one or more computing devices offering services, and sharing the support-information via the private communication line.

8. A system for fabricating a virtual network for providing services securely and efficiently, the system comprising:
a memory storing program instructions; a processor configured to execute program instructions stored in the memory and configured to:
fabricate a virtual network by registering a plurality of computing devices based on an information embedded in network-registration requests received from said plurality of computing devices;
generate a primary data structure representative of the plurality of computing devices categorized into devices offering services and requiring services based on the information embedded in the network-registration requests;
generate a secondary data structure by sub-categorizing the categorized computing devices based on the information embedded in the received network-registration requests, the information including coordinates of the computing devices and a user-address associated with the respective computing devices;
allocate a request-notification generated in response to a support-request received from the computing devices requiring services based on an evaluation of one or more computing devices offering services out of the plurality of computing devices, which are capable of completing said support-request with minimum delay using the primary data structure, the secondary data structure, and a set of predefined attributes, the request-notification is representative of a notification for completing the support-request, wherein the evaluation of the one or more computing devices offering services is performed using a data mapping technique on the primary data structure, the secondary data structure, the set of predefined attributes including a type of service selected from a group consisting of: chat support, dog walking, video and/or audio calls, and mental health check support, a number of incoming support-requests associated with a same type of service, a number of incoming support-requests within a pre-set proximity to the computing devices offering services, and availability of computing devices offering services within the pre-set proximity to the computing device making the support-request; and
enable access to a support-information embedded in the request-notification for the evaluated one or more computing devices on acceptance of the request-notifications by the evaluated one or more computing devices.

9. The system as claimed in claim 8, wherein tracking of the request-notification is enabled on acceptance of the request-notification by the evaluated one or more computing devices, wherein the tracking comprises transmission of real-time progress data of the support-request to the computing devices associated with the support-request.

10. The system as claimed in claim 8, wherein the processor is configured to receive network-registration requests and the support-request from the plurality of computing devices.

11. The system as claimed in claim 8, wherein the processor is configured to authenticate each of the plurality of computing devices prior to registration.

12. The system as claimed in claim 8, wherein the information embedded in each of the network-registration requests is associated with the respective computing devices, said information comprising at least the computing device name, contact details of a user associated with the computing device, computing device coordinates, name and address of a user associated with the computing device, services offered and/or required by the computing device.

13. The system as claimed in claim 8, wherein the support-information comprises at least requirements, coordinates and user details associated with the computing device requiring services.

14. The system as claimed in claim 8, wherein access to the support-information is denied if the evaluated one or more computing device rejects the request-notification for completing the support-request.

15. The system as claimed in claim 8, wherein the request-notification is reallocated to other computing devices offering services out of the plurality of computing devices using the data mapping technique on the primary data structure, the secondary data structure, and the set of predefined attributes if the evaluated one or more computing devices rejects the request-notification.

16. The system as claimed in claim 8, wherein enabling access to the support-information comprises establishing a private communication line between the computing device associated with the support-request and the evaluated one or more computing devices offering services, and sharing the support-information over the private communication line.

17. A computer program product comprising:
a non-transitory computer-readable medium having computer-readable program code stored thereon, the computer-readable program code comprising instructions that, when executed by a processor, cause the processor to:
fabricate a virtual network by registering a plurality of computing devices based on an information embedded in network-registration requests received from said plurality of computing devices;
generate a primary data structure representative of the plurality of computing devices categorized into devices offering services and requiring services based on the information embedded in the network-registration requests;
generate a secondary data structure by sub-categorizing the categorized computing devices based on the information embedded in the received network-registration requests, the information including coordinates of the computing devices and a user-address associated with the respective computing devices;
allocate a request-notification generated in response to a support-request received from the computing devices requiring services based on an evaluation of one or more computing devices offering services out of the plurality of computing devices, which are capable of completing said support-request with minimum delay using the primary data structure, the secondary data structure, and a set of predefined attributes, the request-notification is representative of a notification for completing the support-request, wherein the evaluation of the one or more computing devices offering services is performed using a data mapping technique on the primary data structure, the secondary data structure, the set of predefined attributes including a type of service selected from a group consisting of: chat support, dog walking, video and/or audio calls, and mental health check support, a number of incoming support-requests associated with a same type of service, a number of incoming support-requests within a pre-set proximity to the computing devices offering services, and availability of computing devices offering services within the pre-set proximity to the computing device making the support-request; and enable access to a support-information embedded in the request-notification for the evaluated one or more computing devices on acceptance of the request-notifications by the evaluated one or more computing devices.

\* \* \* \* \*